US012271582B2

(12) United States Patent
Zhao et al.

(10) Patent No.: US 12,271,582 B2
(45) Date of Patent: Apr. 8, 2025

(54) INTELLIGENT DRAWING METHOD AND SYSTEM FOR HUMAN MACHINE INTERACTION HMI DESIGN PROTOTYPE

(71) Applicants: KINGFAR INTERNATIONAL INC., Beijing (CN); NANJING KINGFAR HEALTH TECHNOLOGY INC., Nanjing (CN)

(72) Inventors: Qichao Zhao, Beijing (CN); Ran Yang, Beijing (CN)

(73) Assignees: KINGFAR INTERNATIONAL INC., Beijing (CN); NANJING KINGFAR HEALTH TECHNOLOGY INC., Nanjing (CN)

( * ) Notice: Subject to any disclaimer, the term of this patent is extended or adjusted under 35 U.S.C. 154(b) by 0 days.

(21) Appl. No.: 18/088,920

(22) Filed: Dec. 27, 2022

(65) Prior Publication Data
US 2024/0086049 A1  Mar. 14, 2024

(30) Foreign Application Priority Data
Sep. 14, 2022  (CN) .......................... 202211115495.3

(51) Int. Cl.
*G06F 40/117*  (2020.01)
*G06F 3/0483*  (2013.01)
(Continued)

(52) U.S. Cl.
CPC ........ *G06F 3/04845* (2013.01); *G06F 3/0483* (2013.01); *G06F 3/0488* (2013.01);
(Continued)

(58) Field of Classification Search
CPC .. G06F 3/04845; G06F 40/134; G06F 40/117; G06F 3/0483; G06F 3/0485;
(Continued)

(56) References Cited

U.S. PATENT DOCUMENTS 5,845,299 A * 12/1998 Arora ................... G06F 40/117
715/769
7,559,034 B1 * 7/2009 Paperny .............. G06F 9/44526
715/803
(Continued)

FOREIGN PATENT DOCUMENTS

CN       111966724 A       11/2020

OTHER PUBLICATIONS

Atterer et al, Knowing the User's Every Move—User Activity Tracking for Website Usability Evaluation and Implicit Interaction, publisher: ACM, published: May 2006 (Year: 2006).*
(Continued)

*Primary Examiner* — Wilson W Tsui
(74) *Attorney, Agent, or Firm* — Cooper Legal Group, LLC

(57) ABSTRACT

An intelligent drawing method for human machine interaction HMI design prototype includes: importing an HMI design prototype to be tested; obtaining an HTML script of the imported HMI design prototype page, and displaying the prototype page including content blocks on a display interface; automatically recognizing the content blocks on the prototype page by reading codes of the HMI design prototype page in the automatic recognition drawing mode, monitoring block selection operations of experimenter on the display interface, recognizing the corresponding content block as an interaction area based on a position of the block selection operation, automatically marking the recognized content block as the interaction area, and adding the recognized content area in a drawing area list; and automatically detecting interaction operations of a subject in a process of the subject testing the HMI design prototype, automatically associating the interaction operation with the corresponding content block.

11 Claims, 10 Drawing Sheets

(51) Int. Cl.
  *G06F 3/04845* (2022.01)
  *G06F 3/0488* (2022.01)
  *G06F 40/134* (2020.01)
  *G06F 3/0485* (2022.01)
(52) U.S. Cl.
  CPC .......... *G06F 40/117* (2020.01); *G06F 40/134* (2020.01); *G06F 3/0485* (2013.01)
(58) Field of Classification Search
  CPC .. G06F 40/169; G06F 16/986; G06F 3/04842; G06F 16/95; G06F 3/0488
  See application file for complete search history.

(56) References Cited

U.S. PATENT DOCUMENTS

| | | | | |
|---|---|---|---|---|
| 8,356,277 | B1* | 1/2013 | Bank | G06F 9/45529 |
| | | | | 717/111 |
| 9,582,482 | B1* | 2/2017 | Sharifi | H04W 4/18 |
| 9,678,932 | B2* | 6/2017 | Jwa | G06F 16/9577 |
| 2007/0015118 | A1* | 1/2007 | Nickell | G09B 7/02 |
| | | | | 434/118 |
| 2007/0050703 | A1* | 3/2007 | Lebel | G06F 16/958 |
| | | | | 707/E17.116 |
| 2008/0294981 | A1* | 11/2008 | Balzano | G06F 40/10 |
| | | | | 715/256 |
| 2008/0307328 | A1* | 12/2008 | Hatcher | H04L 51/066 |
| | | | | 715/810 |
| 2010/0115430 | A1* | 5/2010 | Skirpa | G06F 3/0481 |
| | | | | 715/760 |
| 2012/0151329 | A1* | 6/2012 | Cordasco | G06F 16/958 |
| | | | | 715/234 |
| 2012/0290920 | A1 | 11/2012 | Crossley | |
| 2014/0053061 | A1* | 2/2014 | Chasen | G06F 17/00 |
| | | | | 715/234 |
| 2014/0245126 | A1* | 8/2014 | Sharma | G06F 40/143 |
| | | | | 715/234 |
| 2015/0248387 | A1* | 9/2015 | Mattingly | G06Q 50/184 |
| | | | | 715/230 |

OTHER PUBLICATIONS

European Patent Office; European Search Report of corresponding Application No. EP22216996; Aug. 10, 2023; 5 Pgs.
Anonymous; WIKIPEDIA; "Selection (user interface)"; Feb. 1, 2022; 2 Pgs.
Second Office Action received in corresponding European patent application No. 22216996.3, dated May 10, 2024, 9 pages.
Simko, J., et al., "Screen recording segmentation to scenes for eye-tracking analysis", Multimed Tools Appl, Jul. 9, 2018, vol. 78, No. 2, pp. 2401-2425.

* cited by examiner

AOIs
Current Page
- Navigate
- TimeBanner
- TopBanner
- Model
- MusicImage
- Bluetooth
- Need help?
- play control

FIG. 7

INTELLIGENT DRAWING METHOD AND SYSTEM FOR HUMAN MACHINE INTERACTION HMI DESIGN PROTOTYPE

CROSS-REFERENCE TO RELATED APPLICATION

This application claims the priority and benefit of Chinese patent application No. 202211115495.3, filed on Sep. 14, 2022. The entirety of Chinese patent application No. 202211115495.3 is hereby incorporated by reference herein and made a part of this specification.

TECHNICAL FIELD

The present application relates to a field of industry design and in particular, relates to a drawing method and an assessment system for a human machine interface (HMI) of a human machine interaction assessment system.

BACKGROUND ART

With a rapid development of 5G technology (5th Generation Mobile Communication Technology), artificial intelligence, big data, high-performance chip and so on, a feature of intelligence stands out in the advanced equipment manufacturing led by advanced technology. The human centered top-level design requirements are more and more emphasized. An intelligent HMI prototype design in combination with interaction technology such as AR/MR (Augmented Reality/Mixed Reality), gesture interaction, touch, eye movement, and electromyography becomes a trend. However, a traditional obtaining method for human machine interface data information is still adopted in the recognition and assessment processes of related elements of the intelligent HMI prototype design and interaction targets. Moreover, it is rare to see the recognition and drawing of drawing areas (area of interest) such as components and elements in the intelligent human machine interaction interface, and it is seldom to consider the whole assessment process technology and application requirements.

Taken HMI human machine interaction prototype design (or called HMI design prototype) for intelligent cockpit as example, the existing HMI assessment method includes image display method and finish product HMI test method. The inventor found that these assessment methods have deficiencies of different degrees in the process of realizing the present application.

Regarding the image display method, an interface of the HMI system to be assessed is required to be captured as a display element in the design stage. The experimental elements (interface images) are displayed to the subjects in a determined sequence in the experiment. The corresponding data of the subject in the experiment is recorded by the corresponding equipment, for example, using an eye tracker to record eye movement data or using a behavior camera to record behavior data. A statistic and an analysis are conducted on the datum of each subject collected in the experiment process in the experiment analysis stage. The analysis method includes drawing the area of interest of the images one by one, marking and coding the subject behavior one by one and so on. The interaction statistic results on the HML of all subjects are obtained. The evaluation index grades such as applicability, effectiveness and safety of the HMI of the tested car are obtained based on the interaction statistic results of the tested HMI. In this testing method, there is only visual interaction between the subject and the tested HMI image, completely ignoring the original human machine interaction features of HMI, which is incapable of synchronously realizing the human machine interaction and the data record, so as to greatly influence the reliability of the collected datum. In addition, drawing the drawing area is conducted in the data analysis process after the experiments in the image display method. The experimenter needs to carefully draw the drawing area along the contour of the target element on the HMI image serving as the stimulus element, and conducting an editing operation such as naming the drawing areas one by one and changing the marked color. The experimenter needs to conduct the recognition and drawing of the drawing areas one by one for each image stimulus. It may be required to draw dozens of drawing areas on one image. Hundreds of drawing areas is required to be manually drawn in one experiment, which is bound to take a lot of time and energy. In addition, the congruence between the drawn drawing area and the target element is greatly influenced by the drawing ability, which means that the analysis method of the drawing area is not convenient enough.

Regarding the finish product HMI test method, the steps are substantially same as those of the image display method, which differs in the method of displaying the stimulate and recording the data. The stimulate displaying method may adopt interactive finish product HMI. The data recording method is placing the subject in the experiment scene, requiring the subject to interact with the HMI as the test subject according to the instructions, recording and saving the human machine interaction process in a form of video using an external motion tracking system to record the finger motion of the subject, and using the eye tracker to record the eye movement interaction between the subject and the HMI. In the experiment process of the finish product HMI test method, although the subject is directly interacted with the HMI, the interaction datum needs to be monitored and recorded by the third equipment, the obtained datum needs to be manually superimposed in the HMI page after the experiment so as to be finally displayed, which cannot realize obtaining a real-time human machine interaction data. In addition, the deviation is bound to occur in the data superimposition process. Moreover, the experiment analysis relies on the video. The drawing area recognition and drawing are required to be conducted for the experiment process videos of each subject when drawing the drawing area. These processes not only take a lot of time and energy, but also causes a deviation of drawing areas drawn in different record videos for the same element in the same page, further leading to an inaccurate analysis result. Further, it costs a lot to modify the developed HMI according to the test results.

Therefore, it is essential to provide a technology for testing and assessing the intelligent human machine interaction HMI design prototype, which has a low modification cost for optimizing the HMI and iterating functions, a high efficiency and a high accuracy.

SUMMARY

In view of this, the embodiment of the present application provides an intelligent drawing method and system for human machine interaction HMI design prototype, which can be used in the test and assessment process of the intelligent human machine interaction HMI prototype design to eliminate and reduce one or more deficiencies in the existing technology.

In one aspect, the present application provides an intelligent drawing method for human machine interaction HMI design prototype. The method includes the following steps:
importing an HMI design prototype to be tested;
obtaining an HTML script of a page of the imported HMI design prototype, and displaying a prototype page including content blocks on a display interface;
automatically recognizing the content blocks on the prototype page by reading codes of the HMI design prototype page in an automatic recognition drawing mode, monitoring a block selection operation of an experimenter on the display interface, recognizing a corresponding content block as an interaction area based on a position of the block selection operation, automatically marking the recognized content block as an interaction area, and adding the recognized content area in a drawing area list; and
automatically detecting an interaction operation of a subject in a process of the subject testing the HMI design prototype, automatically associating the interaction operation with a corresponding content block and saving association data when a position of the interaction operation is matched with a content block in the drawing area list.

In some embodiments of the present application, the method further includes: detecting a recognition drawing scope selected on the display interface in a custom drawing mode, marking the recognition drawing scope and adding the recognition drawing scope in the drawing area list.

In some embodiments of the present application, the tested HMI design prototype adopts the online HMI design prototype or the local HMI design prototype, the step of importing the tested HMI design prototype includes importing the HMI design prototype in the human machine interaction assessment system via entering a URL link of the online HMI design prototype or specifying a path of the local HMI design prototype page.

The step of obtaining the prototype page data, automatically recognizing the content block on the prototype page and displaying the content block of the prototype page on the display interface includes obtaining the HTML script of the prototype page, automatically recognizing the content block of the prototype page via parsing the HTML script, and displaying the content block of the prototype page on the display interface of a browser.

In some embodiments of the present application, the step of monitoring block selection operations of experimenter on the display interface includes monitoring view events of the experimenter on the display interface, automatically highlighting the corresponding position of the content block based on the positions where view events occur; and the step of detecting the recognition drawing scope selected on the display interface in a custom drawing mode, marking the recognition drawing scope and adding the recognition drawing scope in the drawing area list includes monitoring the selecting operations by the experimenter on the highlighted content blocks on the display interface, automatically marking the highlighted content block when the selection operation of the content block is detected, and adding the content block in the drawing area list.

In some embodiments of the present application, the method further includes setting a property of the drawn drawing area, wherein the setting a property of the drawn drawing area comprises editing a name and/or a marking color of the drawing area.

The setting a property of a drawing area that is drawn in the custom drawing mode includes at least one of the following operations: a drawing area scale setting operation, configured for setting a scaling and a displacement of the drawing area that is drawn in the custom drawing mode when a size of a page is changed; an alignment setting operation, configured for setting a symmetric manner of the drawing area in a longitudinal and/or transverse direction; a moving setting operation, configured for determining whether the drawing area is scrolled and moved with the page when the prototype page is scrolled up and down; and a cross-page property setting operation, configured for, when skipping to a page, determining whether the drawing area is fixedly displayed on the page to be skipped.

In some embodiments of the present application, the selected recognition drawing scope has a predetermined shape, the predetermined shape is one of the following shapes: rectangle, circle, ellipse, polygon and irregular shape drawn based on drawing trajectory.

In some embodiments of the present application, the drawn drawing area in the automatic recognition drawing mode is fixedly associated with the content block covered by the drawing area, and the drawn drawing area in the custom drawing mode is not fixedly associated with the content block covered by the drawing area.

In some embodiments of the present application, the data generated in the interaction operation process is directly superimposed on the prototype page to integrate with the prototype.

The present application provides an intelligent drawing system for human machine interaction HMI design prototype in another aspect. The system includes a processor and a memory, in which computer instructions are stored in the memory, and the processor is configured to process the computer instructions stored in the memory, and when the computer instruction is executed by the processor, the system implements the steps of the above method.

The present application provides a computer-readable storage medium in another aspect, a computer program is stored therein, when the computer program is executed by the processor, it implements the steps of the above method.

The intelligent drawing method and system for human machine interaction HMI design prototype in the embodiments of the present application read the source code of the HMI design prototype by directly importing the HMI design prototype in the assessment system, automatically recognize the content block of the prototype interface, and automatically draw the drawing area based on the recognized content block. The interaction data between the subject and the prototype is directly recorded using the drawing area in the experiment process. The cost of the HMI design prototype modification is small. The present application has higher efficiency, reliability, accuracy, and convenience compared to the traditional method, so as to better promote the development of car HMI, improving the applicability and user experience of HMI.

The additional advantages, purposes and features of the present application are partly described in the following description, and those will be obvious for those skilled in the art after studying the subsequent description, or those will be obtained according to the implementation of the present application. The purposes and the advantages of the present application can be realized and obtained by the specific structure mentioned in the description and drawings.

Those skill in the art should understand that, the purposes and advantages of the present application are not limited to the above detail description, the above-mentioned and other purposes realized by the present application is more clear understood according to the detail description below.

BRIEF DESCRIPTION OF THE DRAWINGS

The drawings described herein are intended to provide a further understanding of the present application, constituting a part of the present application instead of the limitation of the present application. The components in the drawings are not drawn in proportion, to indicate the principles of the present application. In order to facilitate the illustration and description of parts of the present application, the corresponding parts in the drawings may be enlarged, that is, it may become larger than other parts in the exemplary apparatus actually manufactured according to the present application. In the drawings:

FIG. 7 is a schematic screenshot of a drawing area list according to an embodiment of the present application.

DETAILED DESCRIPTION

Figure 1:
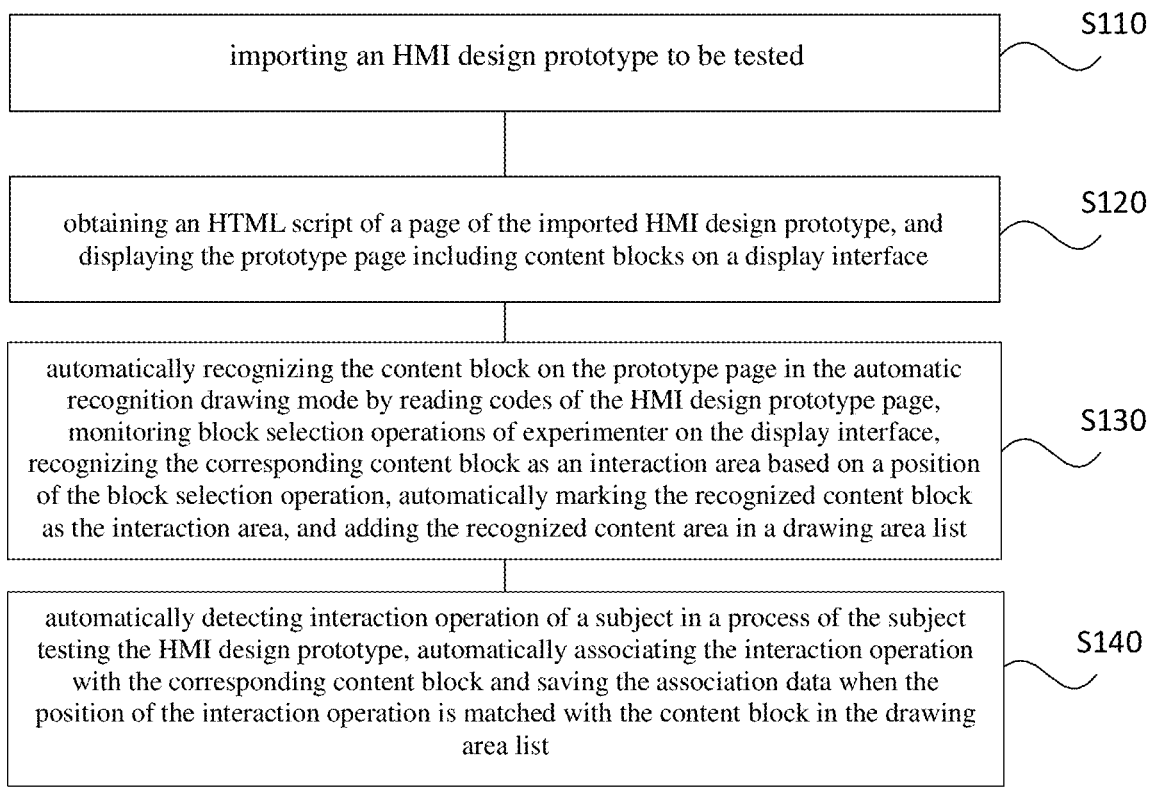
FIG. 1 is a schematic flow chat diagram of a drawing method of an HMI design prototype drawing area in the human machine interaction assessment system according to an embodiment of the present application.

The present application is further described in detail below in combination with embodiments and drawings in order to make the purpose, technical solution and advantages of the present application clearer. Herein, the exemplary embodiments of the present application and the description thereof are intended to explain the present application instead of limiting the present application.

Herein, it should be noticed that the drawings only illustrate the structures and/or processing steps closely related to the technical solution of the present application, and omit the other details less related to the present application, in order to avoid obscuring the present application due to the unnecessary details.

It should be emphasized that, the term "include/comprise" using in the present application refers to the existence of the features, elements, steps or assemblies, but not excludes the existence or addition of one or more other features, elements, steps or assemblies.

In view of the key technical problems that the HMI test process of the existing car has a long HMI test time, a low accuracy, a low efficiency and a high cost caused by the incapability of directly recording the human machine interaction data and low accuracy and efficiency of recognizing and drawing of the drawing area, the present application provides a source code reading and recognizing technology directing to the problems, and provides an intelligent recognizing and drawing method for HMI design interface based on this technology.

The source code is read and recognized by one click, and is imported in the human machine interaction assessment system in an embodiment of the present application. The technology allows the experimenter (the user of the assessment system, such as experiment designers) directly importing the car HMI design prototype in the assessment system, and can read the source code of the car HMI design prototype by one click, and automatically recognize a content block of a prototype interface. The drawing of the drawing area can be finished in the experiment design stage, the interaction data between the subject and the prototype can be directly recorded using the drawing area during experiment, which is facilitate modifying the car HMI design prototype with a low cost. The HMI test becomes faster, more accurate, and more efficient and has a lower cost, so as to promote the development of car HMI, increase the applicability of car HMI and improve the user experience.

Before executing the steps of the present application, a design of HMI design prototype is firstly conducted, and the designed HMI design prototype is exported. Then the experiment is designed, and a car HMI assessment of conducted based on the designed experiment.

The product prototype is a product model detailedly designed before the product goes on the market. The materials, components, design and assembling manners involved in the product prototype must be consistent with the final product. In a common understanding, the car HMI design prototype is a draft of the car HMI in the prototype design stage. The functions of the car HMI design prototype are mainly divided into 4 categories: a main driving control function (basic function), a necessary driving auxiliary function (necessary safety type), an optional driving auxiliary function (unnecessary safety type) and a comfort control function (comfort and entertainment function). The car HMI design prototype has the same functions and interactions as the finish product, but the content has not been finalized and can be further modified and improved. The HMI design prototype design is finished by the staff responsible for the HMI development. The developer designs the prototype according to the specific requirements for HMI development, which include page layout, interaction design and so on. The finished prototype is exported in the form of online page HMI design prototype (hereinafter referred to as online HMI design prototype) or local page prototype (hereinafter referred to as local HMI design prototype). The design manners of the HMI design prototype don't belong to the key point of the present application. Therefore, the design manner is not limited, which can adopt the existing design manner of the HMI design prototype, or the improved design manner of the HMI design prototype.

The overall experiment processes should be determined in the experiment design stage, which includes determining the HMI functions and features to be mainly tested in the experiment, and determining the required experiment environment, equipment, and the requirements for recruiting the subjects. The drawing area is required to be drawn in this stage.

After experiment design, the interaction data can be directly recorded using the drawing area during the experiment. A car HMI assessment can be conducted using the human machine interaction assessment system based on the designed experiment process and the exported car HMI design prototype.

A recognizing and drawing method of HMI drawing area of the embodiment of the present application is described below. The recognizing and drawing method of HMI drawing area in the present application be used not only in recognizing and drawing of the car HMI drawing area, but also in recognizing and drawing of the HMI drawing area of the other vehicle, such as planes and ships.

FIG. 1 is a schematic flow chat diagram of a drawing method of an HML design prototype drawing area in the human machine interaction assessment system according to an embodiment of the present application. As shown in FIG. 1, the recognizing and drawing method of the drawing area includes the following steps:

step S110: importing an HMI design prototype to be tested in a human machine interaction assessment system.

Figure 2:
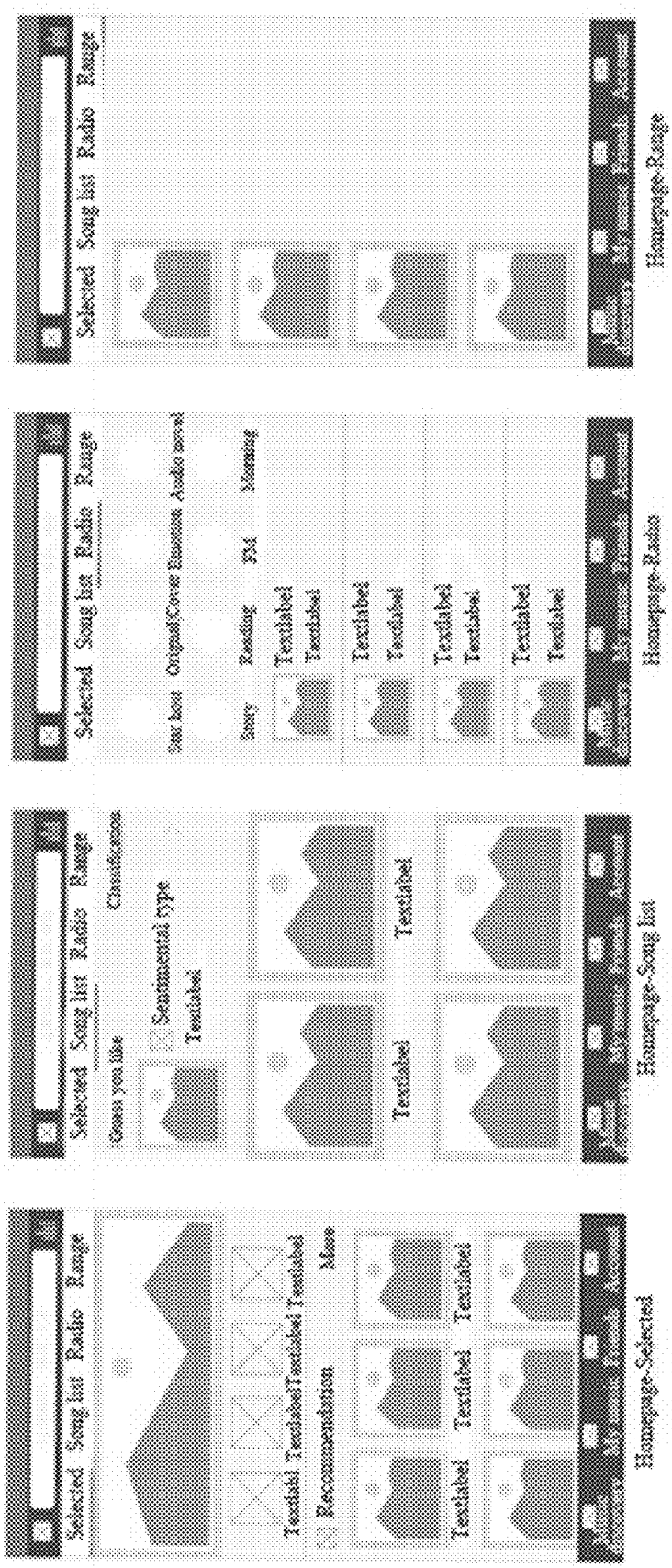
FIG. 2 is a low-fidelity prototype schematic diagram.
Figure 3:
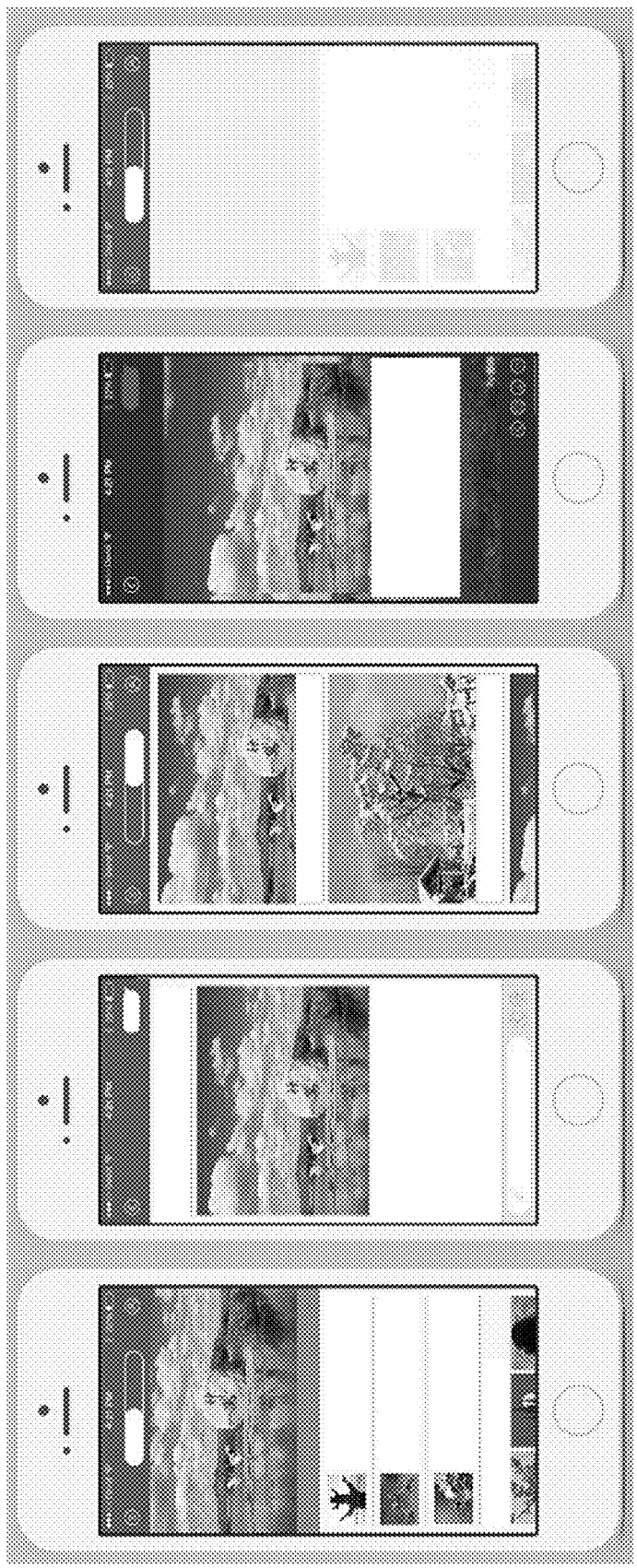
FIG. 3 is a high-fidelity prototype schematic diagram.

In the embodiments of the present application, the HMI design prototype to be tested can be a low-fidelity prototype or a high-fidelity prototype. The low-fidelity prototype displays the real product without skins by adopting the method of using wireframe description, which can reflect the basic function and using effect of the product as shown in FIG. 2. The main features of the low-fidelity prototype are having standard page structures, content and function layouts, clear product structures, business logics and functional processes, and fast production and convenient modification. The high-fidelity prototype is same as the real product in visual, and the interaction experience thereof is highly close to the real product (a data interaction is preset instead of a real data interaction), as shown in FIG. 3. The main features of the high-fidelity prototype are: the visual effect, interaction effect and experience effect are built, but the production cycle is relatively long and the modification is time and energy consuming.

In this step, the HMI design prototype can be conveniently imported in the human machine assessment system by entering an URL (Uniform Resource Locator) link of the online HMIU design prototype, when the imported the HMI design prototype to be tested is the online HMI design prototype.

The HMI design prototype can be conveniently imported in the human machine assessment system by specifying a storage path such as a path of the local HMI design prototype page, when the imported the HMI design prototype to be tested is the local HMI design prototype.

It can be seen from the above, the present application not only support customized import of the local HMI design prototype custom, in which the system supports one click import by directly selecting the folder of the HMI design prototype drawn by the prototype software, but also support manually adding the HMI design prototype preview address, in which the system supports one click read by manually entering the HMI design prototype preview address drawn by the prototype software. The system in the present application can be compatible with common prototype software on the market, such as Modao, Axure, and xiaopiu. In addition, the present application also supports HMI-design-prototype-adaptive HMI UE (User Equipment) human-machine display interface, which is not required the secondary and manual adjustment.

Step S120: obtaining an HTML script of the imported HMI design prototype page, and displaying the prototype page including content blocks on a display interface.

After importing the car HMI design prototype to be tested in the human machine interaction assessment system, the HM design prototype page can be viewed and interacted in the embedded browser of the assessment system by obtaining the HTML script of the imported HMI design prototype page.

Figure 4:
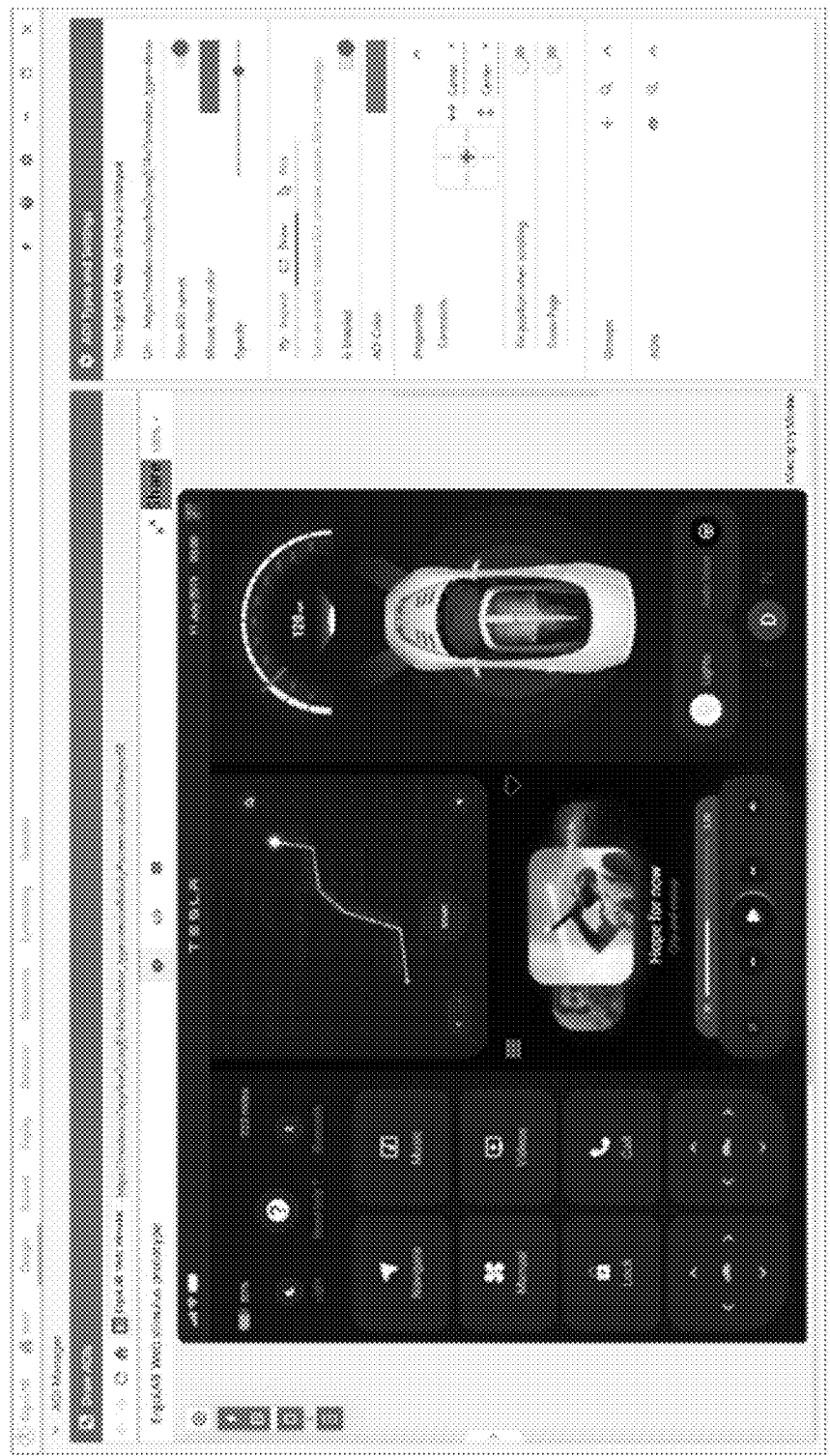
FIG. 4 is a schematic screenshot of an HMI design prototype of a car displayed on an embedded browser of a human machine interaction assessment system according to an embodiment of the present application.

In this step, the principle of the human machine interaction assessment system reading and recognizing the HMI design prototype is as follows:

(1) For the online HMI design prototype, the embedded browser of the human machine assessment system can track the prototype page according to the provided URL, obtain the HTML script of the page, and display the prototype page on the embedded browser of the human machine assessment system in a form of interactive graphic text via compiling the script, as shown in FIG. 4.

(2) For the imported local HMI design prototype, the embedded browser of the human machine assessment system can track the position of index.HTML file of the prototype page according to the folder path, obtain the HTML script of the page, and display the prototype page on the embedded browser of the human machine assessment system in a form of interactive graphic text by compiling the script, as shown in FIG. 4.

In the embodiments of the present application, since the prototype page is completely imported in the human machine interaction assessment system, the human machine interaction assessment system keeps the prototype content and the interaction complete, so as to completely reflect the page features and interaction features of the prototype. The experimenter and the subject can freely browse the content of each prototype page, switch to different pages according to the interaction process.

In the embodiments of the present application, the human machine assessment system displays the prototype page on the embedded browser of the human machine assessment system in a form of interactive graphic text by obtaining the HTML script of the HMI design prototype and compiling the script, and supports the interaction among the experimenter, the subject and the HMI design prototype, to finish the assessment of the functions, features and appearance of the HMI design prototype.

In the embodiments of the present application, the HMI prototype page is designed to include a plurality of content blocks. The present application can recognize the content blocks of the source code by reading the source code of the prototype and automatically analyzing the source code. The present application realizes the rapid drawing of the drawing area based on the automatic recognition of the content blocks, which will be described below.

The experimenter can recognize and draw the drawing area in the experiment design stage after importing the HMI design prototype in the humane machine interaction assessment system and compiling the HMI design prototype to the embedded browser by system. The system in the present application supports tow manners to draw the prototype drawing area: an automatic recognition drawing mode and a custom drawing mode, which will be respectively described below.

Step S130: automatically recognizing the content blocks on the prototype page by reading codes of the HMI design prototype page in the automatic recognition drawing mode, monitoring block selection operations of experimenter on the display interface, recognizing the corresponding content block as an interaction area based on a position of the block selection operation, automatically marking the recognized content block as the interaction area, and adding the recognized content area in a drawing area list.

The drawing area is a specific area drawn on the page of experimental stimulus elements. Generally, the focused elements on the page are taken as the drawing area. In some embodiments, the drawing area can be an AOI (Area of Interest). After the experiment, a data analysis is conducted on the drawing areas of the stimulus elements, further to obtain the experiment conclusion.

The step of monitoring block selection operations of experimenter on the display interface includes monitoring view events of the experimenter on the display interface (such as the browsing path on the interface through the mouse or touch tool), and automatically highlighting the corresponding position of the content block based on the positions where view events occur. In the embodiment of the present application, the detail operation of drawing the drawing area using the automatic recognition mode is as follows:

selecting an instruction displayed on the prototype page of the embedded browser to enter the automatic recognition drawing mode, entering a drawing area automatic editing interface of the human machine interaction assessment system, and starting the automatic recognition drawing mode.

When conducting the automatic drawing of the drawing area, it can adopt a customized row and column matrix method, or a drawing area pickup method. For the customized row and column matrix method, the system support customizing the HMI design prototype row and column matrix, and drawing a drawing area in multiple rows and columns (>99) by one click. The matrix draws the whole page starting with an upper left corner of the page as the (0, 0) point, and it supports a self-adaptive HMI UE human machine display interface size. For the drawing area pickup method, the system supports intelligently recognizing the HTML source code of the HMI design prototype. The internal block of HMI design prototype source code is automatically picked up as the interaction area through the source code block (ID/Class) definition rules.

Figure 5:
FIG. 5 is a schematic screenshot of an interface with an automatically highlighted content block corresponding to a hovering position of a mouse according to an embodiment of the present application.

In some embodiments of the present application, the experimenter can control the mouse pointer to slide on the page under the condition of using the mouse to control the interface. The block will be highlighted when the mouse passes the page element block. FIG. 5 is a schematic screenshot of an interface with an automatically highlighted content block corresponding to a hovering position of a mouse according to an embodiment of the present application. When the current highlighted block is required to set as the block of the drawing area, the highlighted block will be marked as drawing area by clicking. For example, this drawing area is highlighted by using a translucent color block mark on the page, and the drawing area is automatically added in the drawing area list of the property bar with the default name.

In the embodiments of the present application, it is not limited to use the mouse pointer to slide on the prototype page. For the interface page using other control manners, the drawing area can be selected by adopting other interaction control manner. For example, for a touch screen that is touched with a finger or stylus, the finger or stylus can be used to slide on the screen. When the finger or stylus passes the page element block, the block will be highlighted. The block will be highlighted by single or double clicking the page element block. The HMI design prototype page can be slid on the display screen by controlling the direction buttons. The block to be highlighted is automatically selected and highlighted on the display interface with the sliding of the HMI design prototype page. The selection of the drawing area is confirmed by confirmation button (such as enter button), so that the drawing area can be automatically drawn. The present application is not limited to these examples.

In the embodiments of the present application, it can not only use the translucent color block mark for highlighting, but also conduct a mark and a highlight by filling other colors, changing the transparency and outlining. However, the present application is not limited to these examples, it can adopt any method that can distinguish a selected area from an unselected area.

Figure 6:
FIG. 6 is a schematic screenshot of an interface of automatically drawing a content block of a drawing area on an HMI design prototype according to an embodiment of the present application.

FIG. 6 illustrates an example that the human machine interaction assessment system automatically recognizes the content blocks of the source code by reading the source code of the prototype according to an embodiment of the present application. The drawing areas can be automatically drawn by selecting blocks on the HMI design prototype page. All content blocks can be automatically recognized by selecting the whole page, and all content blocks are set as the drawing area by selecting all content blocks. FIG. 7 is a schematic diagram of drawing area list drawn in an embodiment of the present application. In the embodiment of the present application, the experimenter can customize the properties such as name, mark color, and display/hide by setting the property setting options of the drawing area on the display interface.

The operation principle of this step in the automatic recognition drawing mode can be simply summarized as: the system automatically recognizes the code blocks, and records the specific blocks as the drawing area, in which the recognized blocks can serve as the interaction area to monitor the interaction data. The detail operation principle is as follows:

(1) obtaining the prototype code, in which
after importing the HMI design prototype in the humane machine interaction assessment system, the system obtains the HTML source code of the prototype page by provided URL or the local storage path of the page.

Figure 8:
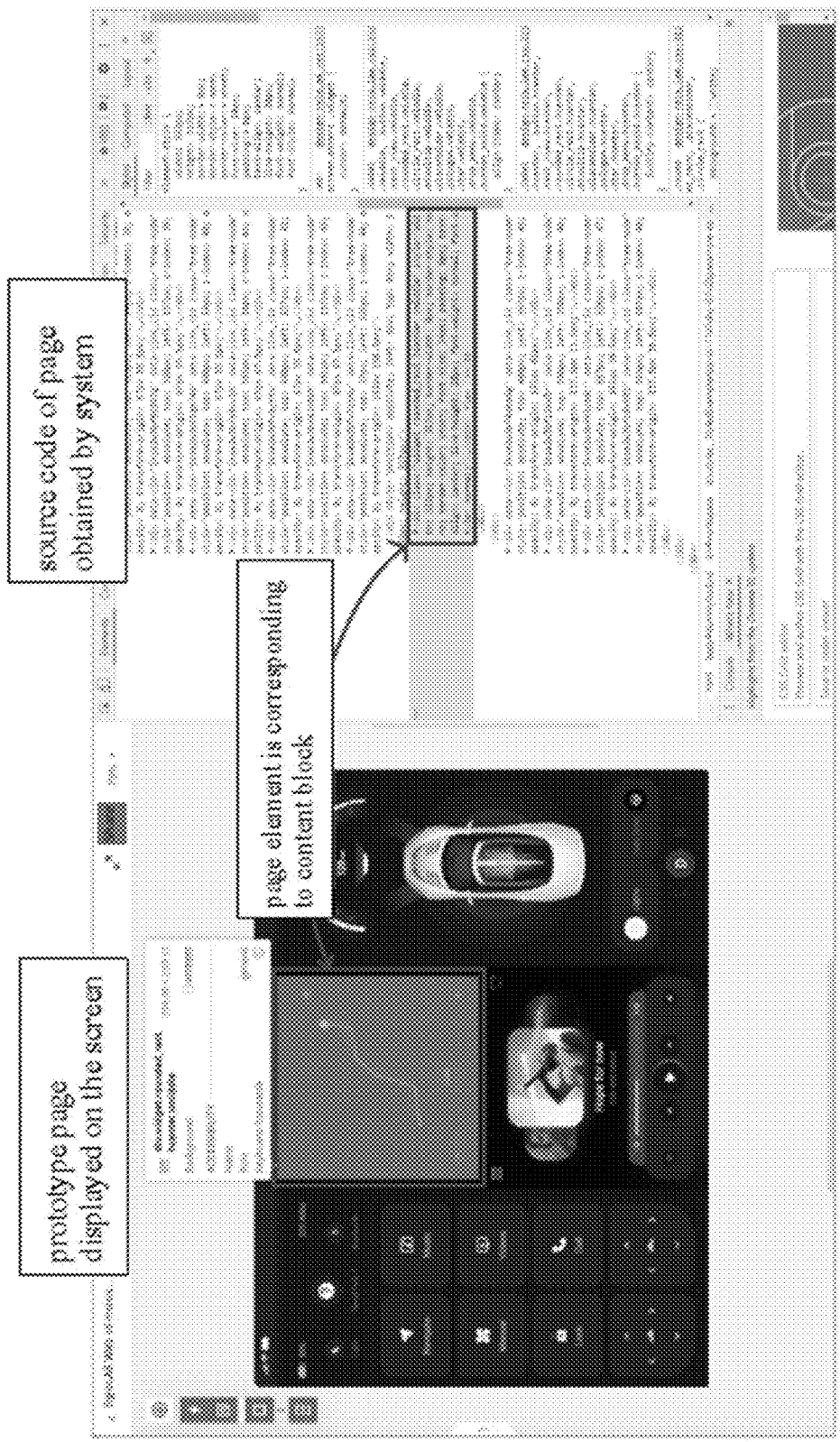
FIG. 8 is a schematic diagram of an HMI design prototype source code recognized by a human machine interaction assessment system according to an embodiment of the present application.

(2) dividing the code content blocks, in which
after the system obtaining the HTML source code of the prototype (as shown on the right in FIG. 8), the source code is automatically compiled in backend to recognize content blocks of the source code (area divided by <div> or <class> tag), and the content block is displayed on the screen according to the block property. The block property includes related contents, such as block ID, drawing area size, drawing area position, drawing area color and so on.

(3) specifying a specific content block as the drawing area, in which
after the content blocks of the source code are recognized, the human machine interaction assessment system will monitor the movement of the touch object (such as mouse pointer, finger, stylus, moving button of the keyboard) on the prototype page. When the mouse pointer is slid on the prototype page, the system will automatically recognize the position of the mouse and project it to the corresponding content block based on the recognized position, and highlight the content block. That is, the system monitors the view events of the experimenter on the display interface, and highlights the content block at the corresponding position based the position of the view event. When the system detects the selection operation (for example, monitoring the click action of mouse) of the highlighted content block by the experimenter, the system will correspondingly select the content block to record as the drawing area and add it in the drawing area list. Optionally, when marking the selected content block as the drawing area, a transparent color block can be covered on the block as marks, but the present application is not limited to this.

Figure 9:
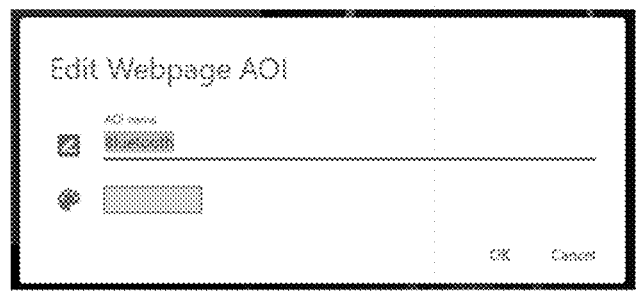
FIG. 9 is a schematic screenshot of editing a name and a marking color of a drawing area according to an embodiment of the present application.

(4) editing the drawing area, in which the system automatically adds the new drawing area in the drawing area list. The experimenter can change the name and the mark color of the drawing area by editing tools. The editing results can be directly checked from the page and the list. FIG. 9 is a schematic diagram of editing a name and a marking color of a drawing area according to an embodiment of the present application.

In the embodiments of the present application, for a certain drawing areas fixedly displayed on different pages (such as a banner bar at the top of the page for indicating the time, date and signal intensity), the human machine interaction assessment system also provides a function of cross page drawing area, that is, when a specific content block is set as the drawing area, the "cross page display" property is opened. When switching to other pages, the system will automatically detect whether the current page includes this content block. When the content block is included, the system will automatically mark this content block as the drawing area, in which the name and the mark color are the same as previously set.

In the embodiment of the present application, it enters the custom editing interface of the drawing area of the human machine interaction assessment system and opens the custom drawing mode of the drawing area, if selecting the instruction on the prototype page displayed on the embedded browser. In view of some content elements with special shape, it may require striding over multiple content blocks to draw the drawing area, in which the custom drawing mode is preferably to selected to draw the drawing area.

In this step, the selection operation of the highlighted content block on the display interface by the experimenter is monitored. When detecting the selection operation of the block, the highlighted content block is automatically marked as the drawing area, and is added in the drawing area list.

The detail operation of drawing the drawing area using custom drawing mode is as follows:

for the manual manner for customizing the drawing area, the system supports customizing the drawing area of different shapes, sizes and positions as the interactive area of interest by long pressing the mouse on the HMI design prototype.

Figure 10:
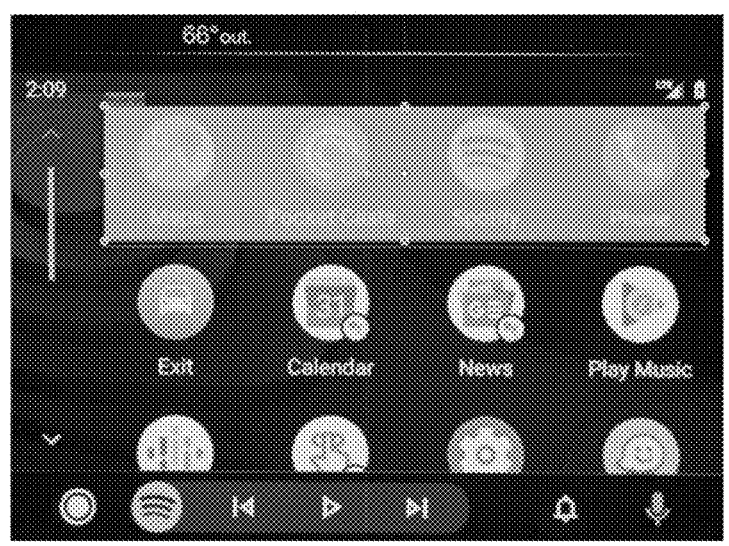
FIG. 10 a schematic screenshot of drawing a rectangle drawing area in a custom mode according to an embodiment of the present application.
Figure 11:
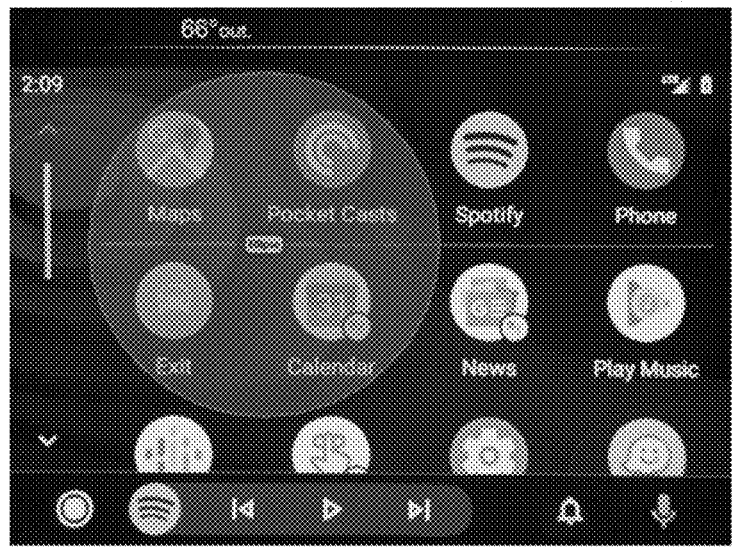
FIG. 11 a schematic screenshot of drawing an ellipse drawing area in a custom mode according to an embodiment of the present application.
Figure 12:
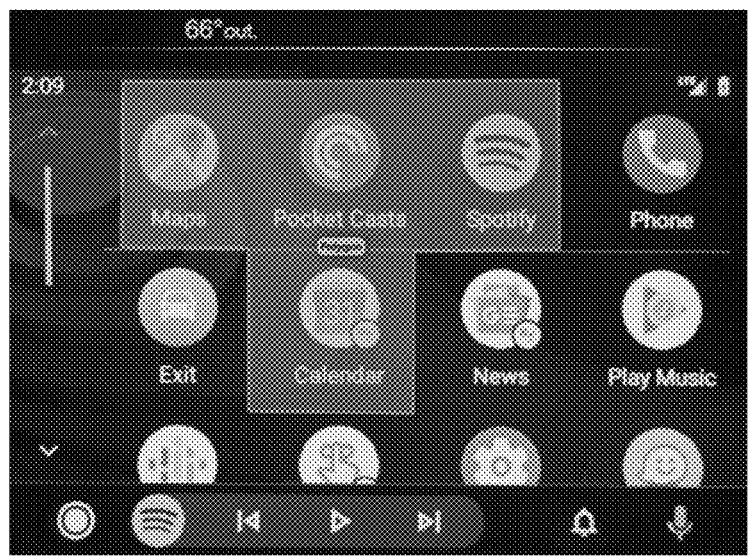
FIG. 12 a schematic screenshot of drawing a polygon drawing area in a custom mode according to an embodiment of the present application.

After the experimenter opening the custom drawing mode, the recognition and drawing scope of the drawing area can be selected by mouse, finger or other interactive tools. The system detects the selected recognition and drawing scope of the drawing area selected on the display interface, and marks the recognition and drawing scope of the drawing area and adds it in the drawing area list. For example, after the experimenter opening the custom drawing mode, the mouse cursor will change into a cross shape. Pressing the cursor to drag on the page, a translucent drawing area is appeared at the corresponding position on the page for indicating that the recognition and drawing scope of the colored translucent drawing area is selected. After selecting the recognition and drawing scope of the drawing area, the colored translucent drawing area is appeared at the corresponding position on the page according to the predetermined shape of the selected scope, and this drawing area is automatically added in the drawing area list of the property bar with a default name. In the embodiments of the present application, the predetermined shape of the selected scope can be one of the following shapes: rectangle, circle, ellipse, polygon and irregular shape drawn based on drawing track. FIGS. 10-12 are respective the rectangle drawing areas, the ellipse drawing area and the polygon drawing area drawn in a custom mode according to an embodiment of the present application.

In the embodiments of the present application, the experimenter can set the property of the drawing area according to the requirements, which includes editing the name and/or marking color of the drawing area in the automatic recognition drawing mode and the custom drawing mode. For drawing the drawing in the custom drawing mode, one or more operations can be conducted to set property:

(1) a basic setting:

editing name and mark color of the drawing area, which is same as those in the automatic recognition drawing mode.

(2) a drawing area scale setting operation, configured for setting a scaling and a displacement of the drawing area that is drawn in the custom drawing mode when a size of a page is changed, so as to ensure marking the fixed content blocks throughout.

(3) an alignment setting operation, configured for setting a symmetric manner of the drawing area in a longitudinal and/or transverse direction, in which longitudinal and transverse symmetric manners can be respectively set, in which the longitudinal options are: left alignment, center alignment and right alignment; and the transverse options are: top alignment, center alignment and bottom alignment.

(4) a moving setting operation, configured for determining whether the drawing area is scrolled and moved with the page when the prototype page is scrolled up and down; and (5) a cross-page property setting operation, configured for, when skipping to a page, determining whether the drawing area is fixedly displayed on the page to be skipped.

The operation principle of this step in the custom drawing mode can be simply summarized as: a transparent canvas is added above the prototype page, the experimenter can draw blocks of different shapes on the canvas as the drawing area, which is not influenced by the content blocks divided by the HMI design prototype source code. Therefore, different from the automatic recognition of the drawing area, where the drawing area is directly generated on the attached content block, the drawing area created by the custom drawing method is dissociated from the prototype page, it is necessary to set the scaling, alignment, movement, and cross page properties.

That is, the drawn drawing area in the automatic recognition drawing mode is fixedly associated with the content blocks covered by the drawing area, and the drawn drawing area in the custom drawing mode is not fixedly associated with the content blocks covered by the drawing area.

One of two drawing modes of the automatic recognition drawing mode and the custom drawing mode can be selected according to different factors requiring testing in the present application. Preferably, the automatic recognition drawing mode can be selected when it requires rapidly selecting a regular block as the drawing area, and the custom drawing mode can be selected to draw the drawing area, when involving a content block with special shapes or the condition of drawing the drawing area over the multiple content blocks.

Step S140: automatically detecting the tested interaction operation in the process of the subject testing the HMI design prototype, automatically associating the interaction operation with the corresponding content block and saving the association data when the position of the interaction operation is matched with the content block in the drawing area list.

When the experiment officially starts, the experimenter controls the system, and provides subject with the HMI design prototype to be tested by the related display device. The subject is required to interact with the HMI design prototype according to the task instructions. During the experiment, when the subject touches or slides in the drawing area of the prototype page by finger or mouse, that is, the position of the interaction operation is matched with the drawing area in the drawing area list, the system will automatically record the action time and the coordinate position, and save that in the backend database.

In the embodiments of the present application, the related data of the subject can be monitored in the whole experiment by one or more devices of eye tracker, facial expression device, electroencephalogram device, finger motion tracking system and video monitoring device. The eye tracker can capture the position of human eyes, determine the motion state of human eyes (such as gazing, blinking, eyelid tremulous etc.), and record the eye movement data such as eye movement trajectory when processing the visual information. It can be determined which drawing areas are more likely to attract attention based on the eye movement data, and HMI design can be assessed. The facial expression device is used to capture the facial expression, to analyze the state of the subject (such as tension, pleasure, frown etc.) based on the facial expressions and assess the area of interest based on the facial expression analysis. The electroencephalogram device is used to test the motion state of the subject through the electroencephalogram. It can also determine the influence of different drawing areas on the user emotion based on the electroencephalogram data. The finger motion tracking system is used to detect the motion trajectory of the finger. It can determine which drawing areas are easily to be operated based on the finger motion trajectory. These test data are only the examples, it can conduct the HMI test in combination with other test devices.

After the experiment, the collected human machine interaction assessment system operation trajectory data, the drawing area data, the eye tracker data, the facial expression device data, the finger motion tracking data and the video monitoring data can be analyzed. The human machine assessment system provides intuitive data analysis manners like visual heatmap and trajectory diagram, and numerical value analysis manners like sequence analysis and similarity analysis, and can export the interaction raw data for other analysis manner. The agreeableness, user experience and operation efficiency of the design of the HMI design prototype can be assessed by the human machine interaction analysis data.

In the embodiment of the present application, the data obtained from the experiment, including not only the recognition and drawing of the drawing area in the experiment design stage and the human machine interaction in the data collection stage but also the data analysis in the analysis stage, can be directly superimposed on the prototype page and integrated with the prototype.

Figure 13:
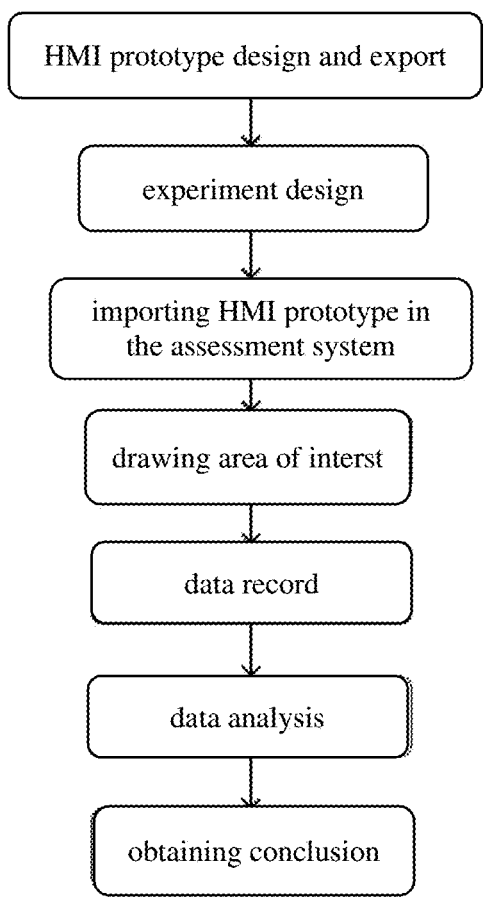
FIG. 13 is a schematic flow chat diagram of an overall HMI test process according to an embodiment of the present application.

The usability, comfortability, learn ability and other target study of the tested HMI design prototype are assessed according to the data analysis result. The assessment result can provide constructive suggestions on improving the HMI design. Referring to FIG. 13, the whole HMI test process are indicated.

It can be seen from the above, the recognition and drawing method for the drawing area of the HMI design prototype has the following advantages:

(1) convenient import of the testing prototype, in which the online prototype can be imported via URL, and the local prototype can be imported by specifying the storage path.

(2) convenient drawing of the drawing area, in which the content blocks can be automatically recognized in the HMI design prototype and the drawing area is directly drawn in an embedded manner based on the recognized content block.

(3) accurate data record, in which the interaction data between the subject and the prototype is accurately recorded in a real time via the accurately drawn drawing area.

(4) completeness of the prototype and the interaction during whole process, in which the data obtained from the experiment, including not only the recognition and drawing of the drawing area in the experiment design stage and the human machine interaction in the data collection stage but also the data analysis in the analysis stage, can be directly superimposed on the prototype page and integrated with the prototype.

Human machine interaction analysis:

(1) finger interaction analysis: the system supports the finger trajectory analysis (including the visualization of the finger trajectory and superimposition analysis of finger trajectories of multiple subjects), the finger clicking analysis, and the finger click AOI sequence analysis based on the HMI design prototype.

(2) eye movement interaction analysis: the system supports the eye movement interaction analysis based on the HMI design prototype including AOI visual heatmap analysis, trajectory diagram analysis, AOI sequence analysis and AOI similarity analysis.

Synchronous analysis of multimodal data: synchronous collection and analysis of multimodal data such as finger interaction data, eye movement data, physiological data, behavioral expression data, motion posture data, spatiotemporal data and subjective data.

The above description takes the recognition and drawing of the car HMI drawing area for example to explain the present application. However, the present application is not limited thereto. The present application can also be applied to recognition and drawing of the other HMI drawing area.

Corresponding to the above method, the present application further provides a human machine interaction system. The system includes computer devices. The computer devices include a processor and a storage. Computer instructions are stored in the memory, and the processor is configured to process the computer instructions stored in the memory. The system implements the steps of the above recognition and drawing method for HMI design prototype drawing area when the computer instruction is executed by the processor.

The embodiment of the present application further provides a computer-readable storage medium with computer program stored therein. It implements the steps of the above edge computing server deployment method when the computer program is executed by the processor. The computer-readable storage medium can be a tangible storage medium, such as random access memory (RAM), internal storage, read only memory (ROM), electrically programmable ROM, electrically erasable programmable ROM, register, floppy disk, hard disk drive, removable storage disk, CD-ROM, or storage medium in other forms known by those skilled in the art.

Those skilled in the art should understand that each exemplary component, system and method described in combination with the embodiments disclosed herein can be implemented in hardware, software or a combination of the two. Whether it is executed in hardware or software manner depends on the specific application and design constraints of the technical solution. Technicians can use different methods to realize the described functions for each specific application, but such implementation should not be considered beyond the scope of the present application. When implemented in hardware manner, it can be, for example, electronic circuits, application specific integrated circuits (ASIC), appropriate firmware, plug-in, function card, and so on. When implemented in software manner, the elements of the present application are programs or code segments used to perform the required tasks. A program or code segment may be stored in a machine-readable medium, or transmitted on a transmission medium or a communication link through a data signal carried in a carrier wave.

It should be clarified that the present invention is not limited to the specific configurations and processes described above and shown in the drawings. For the sake of brevity, the detailed description of known methods is omitted herein. In the above embodiments, several specific steps are described and shown as examples. However, the method process of the present application is not limited to the specific steps described and illustrated, and those skilled in the art can make various changes, modifications and additions, or sequence change of steps after understanding the spirit of the present application.

In the present application, the features described and/or illustrated in one embodiment can be used in the same or similar manner in one or more other embodiments, and/or combined with the features of other embodiments or substituted for the features of other embodiments.

The above are the preferred embodiments of the present application, which are not intended to limit the present application. The embodiments can be changed and modified for those skilled in the art. Any modification, equivalent change and improvement made according to spirit and principle of the present application should be covered within the protection scope of the present application.

What is claimed is:

1. An intelligent drawing method for human machine interaction (HMI) design prototype, comprising:
    importing an HMI design prototype to be tested in a human machine interaction assessment system, wherein the human machine interaction assessment system supports two manners to draw a prototype drawing area, the two manners comprise an automatic recognition drawing mode and a custom drawing mode, and an HMI prototype page is designed to comprise a plurality of content blocks;
    obtaining a hypertext markup language (HTML) script of a page of the HMI design prototype, and displaying the HMI prototype page on a display interface;
    automatically recognizing the plurality of content blocks on the HMI prototype page by reading codes of the HMI prototype page in the automatic recognition drawing mode, monitoring a block selection operation of an experimenter on the display interface, recognizing a corresponding content block as an interaction area to monitor interaction data between an experimenter and the HMI design prototype based on a position of the block selection operation, automatically marking the recognized content block as the interaction area, and adding the recognized content block in a drawing area list;
    automatically detecting an interaction operation of a subject in a process of the subject testing the HMI design prototype, automatically associating the interaction operation with a corresponding content block, and saving association data in a backend database, wherein the human machine interaction assessment system records an action time and a coordinate position when a position of the interaction operation is matched with a content block in the drawing area list, and an operation principle of the automatic recognition drawing mode comprises:
        importing the HMI design prototype in the human machine interaction assessment system;
        obtaining a prototype code by a provided uniform resource locator (URL) or a local storage path of the page using the human machine interaction assessment system;
        dividing code content blocks, comprising:
            automatically compiling the prototype code to recognize content blocks of the prototype code, and
            displaying the content blocks on a screen of the human machine interaction assessment system according to block properties, wherein the block properties are selected from block identification (ID), drawing area size, drawing area position, or drawing area color;
        specifying a specific content block as a drawing area, comprising:
            monitoring a movement of a touch object on the HMI prototype page via the human machine interaction assessment system, when the touch object is slid on the HMI prototype page, automatically recognizing a position of the touch object and projecting the touch object to a corresponding content block based on the position via the human machine interaction assessment system, highlighting the content block, and when the human machine interaction assessment system detects a selection operation of the highlighted content block by the experimenter, recording the selected content block as the drawing area; and
            adding the selected content block in the drawing area list by the human machine interaction assessment system correspondingly; and
        editing the drawing area; and
    detecting a recognition drawing scope selected on the display interface in the custom drawing mode, marking the recognition drawing scope and adding the recognition drawing scope in the drawing area list.

2. The method according to claim 1, wherein, the HMI design prototype to be tested is an online HMI design prototype or a local HMI design prototype, and the importing an HMI design prototype to be tested comprises: importing the HMI design prototype in a human machine interaction assessment system by entering a URL link of the online HMI design prototype or specifying a path of a local HMI design prototype page; and the obtaining an HTML script of a page of the HMI design prototype and displaying the HMI prototype page on a display interface comprises: obtaining the HTML script of the HMI prototype page, automatically recognizing the plurality of content blocks of the HMI prototype page by parsing the HTML script, and displaying the plurality of content blocks of the HMI prototype page on the display interface of a browser.

3. The method according to claim 1, wherein, the monitoring a block selection operation of an experimenter on the display interface comprises: monitoring a view event of the experimenter on the display interface, and automatically highlighting a corresponding position of a content block based on a position where the view event occurs; and the detecting a recognition drawing scope selected on the display interface in the custom drawing mode, marking the recognition drawing scope and adding the recognition drawing scope in the drawing area list comprises: monitoring a selecting operation by the experimenter on the highlighted content block on the display interface, automatically marking the highlighted content block when the block selection operation of the content block is detected, and adding the content block in the drawing area list.

4. The method according to claim 1, further comprising:

setting a property of a drawn drawing area, wherein the setting a property of a drawn drawing area comprises editing at least one of a name or a marking color of the drawn drawing area; and wherein setting a property of a drawing area that is drawn in the custom drawing mode comprises at least one of the following operations:

a drawing area scale setting operation, configured for setting a scaling and a displacement of the drawing area that is drawn in the custom drawing mode when a size of a page is changed;

an alignment setting operation, configured for setting a symmetric manner of the drawing area in at least one of a longitudinal or transverse direction;

a moving setting operation, configured for determining whether the drawing area is scrolled and moved with the page when the HMI prototype page is scrolled up and down; or a cross-page property setting operation, configured for, when skipping to a page, determining whether the drawing area is fixedly displayed on the page to be skipped.

5. The method according to claim 3, wherein, the recognition drawing scope has a predetermined shape, the predetermined shape is one of: rectangle, circle, ellipse, polygon or irregular shape drawn based on drawing trajectory.

6. The method according to claim 1, wherein, the drawing area that is drawn in the automatic recognition drawing mode is fixedly associated with a content block covered by the drawing area, and a drawing area that is drawn in the custom drawing mode is not fixedly associated with a content block covered by the drawing area.

7. The method according to claim 1, wherein, data generated in the interaction operation is superimposed on the HMI prototype page.

8. The method according to claim 1, wherein, an operation principle of the custom drawing mode comprises:

adding a transparent canvas above the HMI prototype page;

drawing blocks of different shapes on the transparent canvas as the drawing area.

9. The method according to claim 1, wherein, the touch object is a mouse pointer, a finger, a stylus, or a moving button of a keyboard.

10. An intelligent drawing system for human machine interaction (HMI) design prototype, comprising: a processor and a memory with computer instructions stored therein, wherein, the processor is configured to execute the computer instructions stored in the memory to implement the method according to claim 1.

11. A non-transitory computer-readable storage medium with a computer program stored thereon, wherein, the computer program is configured to be executed by a processor to implement the method according to claim 1.

* * * * *